June 6, 1933. L. NUSBAUM 1,912,651
HEAT EXCHANGE APPARATUS
Filed Oct. 6, 1931 2 Sheets-Sheet 1

Inventor
Lee Nusbaum,
By Jas.C.Nobensmith
Attorney.

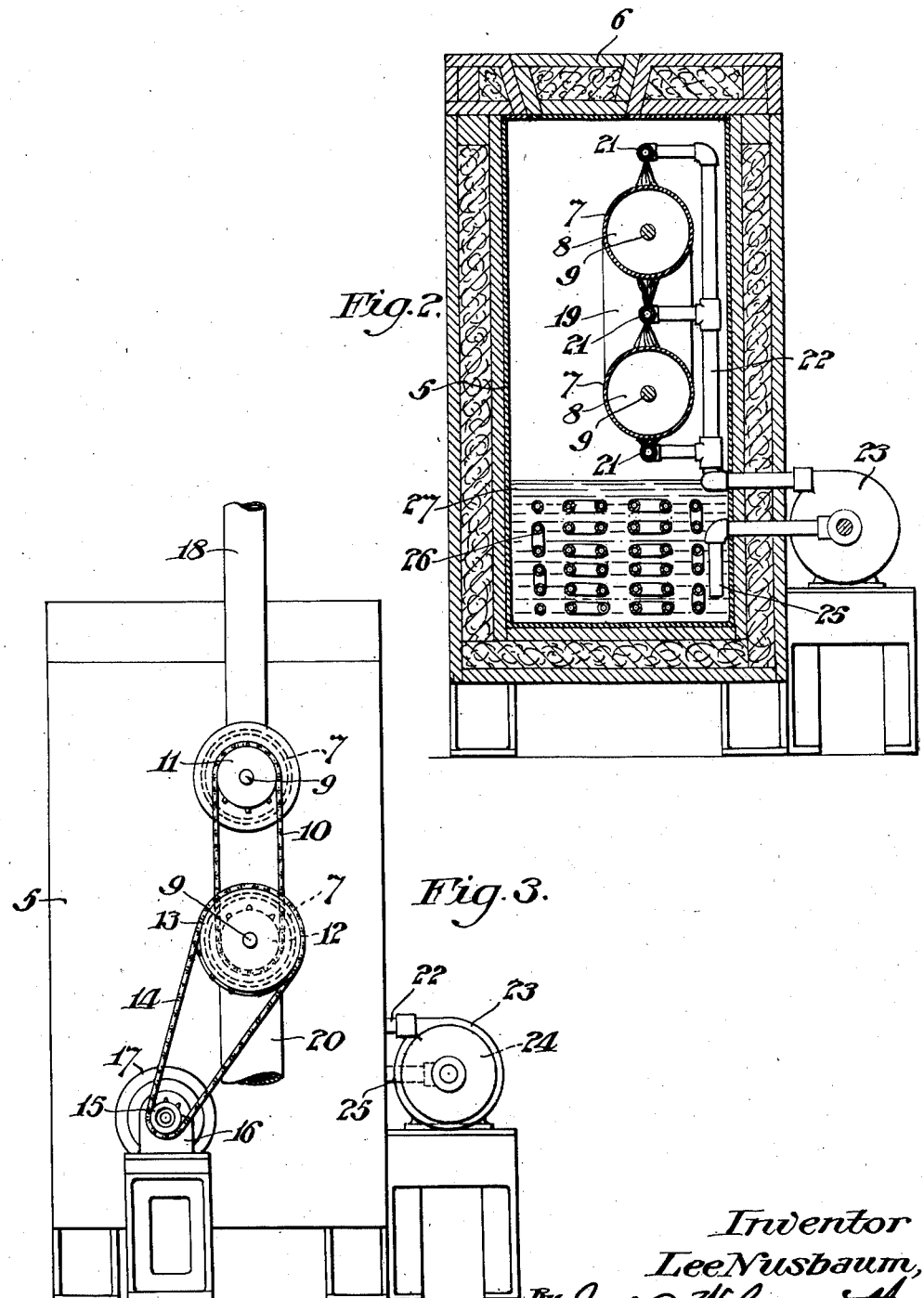

Patented June 6, 1933

1,912,651

UNITED STATES PATENT OFFICE

LEE NUSBAUM, OF PHILADELPHIA, PENNSYLVANIA

HEAT EXCHANGE APPARATUS

Application filed October 6, 1931. Serial No. 567,196.

My invention relates to heat exchange apparatus, that is to say, to apparatus for raising or lowering the temperatures of various materials.

In certain industries, it is sometimes required to raise or lower the temperatures of the materials used. For example, in the baking industry, it has been found desirable to bring the flour, sugar, and other ingredients to certain predetermined temperatures, in order to secure the best results in the use thereof.

The object, therefore, of my present invention is to provide a simple and efficient apparatus for raising or lowering the temperatures of certain materials, which will be continuous in its operation, and by means of which the temperature changes may be effected at a minimum of expense.

The nature and characteristic features of my invention will be more readily understood from the following description, taken in connection with the accompanying drawings forming part hereof, in which:

Fig. 2 is a transverse section thereof, taken on the line 2—2 of Fig. 1; and

Fig. 3 is an end elevation thereof.

Figure 1:
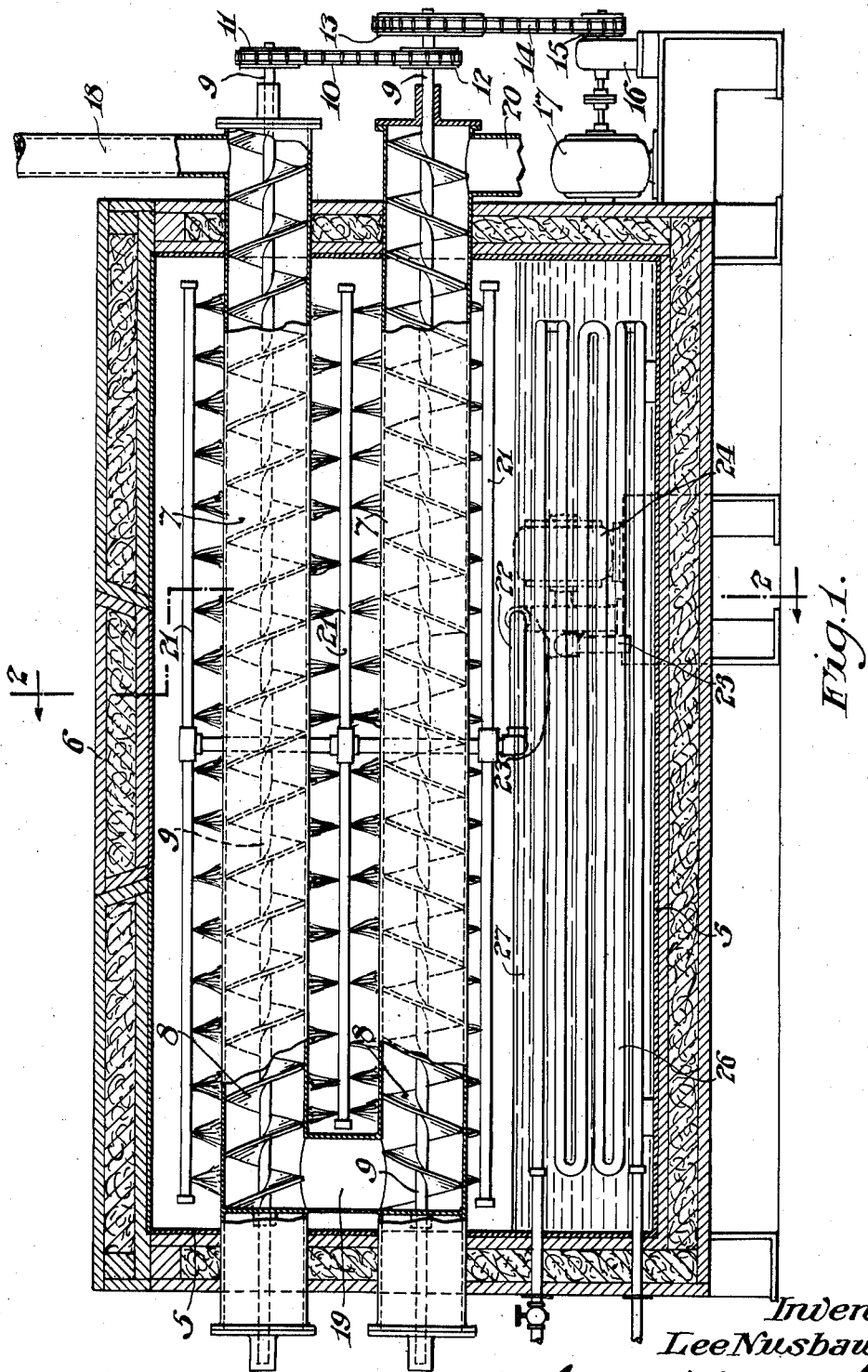
Figure 1 is a longitudinal sectional view, certain parts being shown in elevation, of apparatus embodying the main features of my present invention for effecting temperature changes.

It will, of course, be understood that the description and drawings herein contained are illustrative merely, and that various changes and modifications may be made in the structure disclosed without departing from the spirit of my invention.

Referring to the drawings, in the particular embodiment of my invention therein shown, 5 is a tank having heat insulated walls of any preferred construction. The top portion of the tank is provided with a manhole having a normally closed door 6 to permit access to the interior. Conduits 7 extend horizontally through the upper portion of the tank 5, these conduits preferably being made cylindrical in form, and having conveyors 8, preferably of the helical type, mounted therein.

The operating shafts 9 of the conveyors 8 extend through the ends of the respective conduits, and are preferably driven in unison with each other by means of a chain 10 and sprockets 11 and 12. A sprocket 13 is mounted on one of the conveyor shafts 9, so that the same may be driven by means of a chain 14, which in turn is driven by means of a sprocket 15 mounted on the end of the shaft of a speed reduction gear 16. The speed reduction gear 16 is preferably driven by an electric motor 17.

The material passes into one of the conduits 7 by means of an inlet pipe 18, which extends from the bin or other container (not shown) where the supply of material is stored. A pipe 19 forms a communication between the conduits 7, and the lowermost of said conduits is provided with an outlet pipe 20, which extends to the place where the material is to be used.

A plurality of spray pipes 21 are arranged adjacent the conduits 7, these spray pipes being provided with suitable outlet orifices directed toward the conduits 7, so that the liquid which is supplied under pressure to the spray pipes 21 will be sprayed over the outer surfaces of the conduits. The spray pipes 21 are connected by piping 22 to a pump 23, which may be of the centrifugal type, and which may be driven by an electric motor 24. The suction pipe 25 of the pump 23 extends to the bottom of the tank 5.

A pipe coil 26 is mounted in the lower portion of the tank 5, for the circulation therethrough of a heating medium such as steam, or a cooling medium such as ammonia vapor, sulphur dioxide, methyl chloride, or the like.

In the use of the device, the tank is partially filled with a liquid 27 of sufficient volume to permit the coil 26 to be immersed therein. The particular liquid used will depend upon the temperatures required, water being suitable where the desired temperature of the material operated upon is between the vaporization and freezing temperatures of water. Where lower temperatures are required, brine may be employed as the medium for the exchange of heat between the coil and the conduit walls.

The operation of the apparatus will be readily understood. The heating or cooling medium, as the case may be, is circulated through the coil 26, and the liquid 27 contained in the bottom of the tank 5 thus brought to the desired temperature. As the pump 23 is operated, the liquid contained in the tank will be forced therefrom to the spray pipes 21, and sprayed upon the outer surfaces of the conduits 7. The material being conveyed through the conduits, which is being constantly agitated by means of the conveyors 8, will thus have its temperature changed to correspond to that of the liquid sprayed over the outer surfaces of the conduits.

It will be seen that there is thus provided simple and efficient apparatus which may be economically operated, and by means of which the temperatures of various materials may be raised or lowered as required. The apparatus may be readily built from standard parts, easily procurable in the open market, and the same apparatus may be used for either heating or cooling materials, as may be required from time to time.

I claim:—

1. Apparatus for raising or lowering the temperatures of various materials comprising a tank, a stationary pipe-like conduit extending therethrough, a conveyor mounted in said conduit adapted to convey the material therethrough and simultaneously agitate the same, a heat exchange liquid contained in the bottom of the tank entirely below the conduit, means for heating or cooling said liquid as required, and means adapted to draw the liquid from the bottom of the tank and cause the same to be sprayed over the outer surface of the conduit.

2. Apparatus for raising or lowering the temperatures of various materials comprising a tank, a plurality of stationary pipe-like conduits extending therethrough, conveyors mounted in said conduits adapted to convey the material therethrough and simultaneously agitate the same, a heat exchange liquid contained in the bottom of the tank entirely below said conduits, means for heating or cooling said liquid as required, spray pipes arranged adjacent the conduits, and a pump adapted to draw the liquid from the bottom of the tank and cause the same to be sprayed over the outer surfaces of the conduits from the spray pipes.

3. Apparatus for raising or lowering the temperatures of various materials comprising a tank, a plurality of pipe-like conduits extending therethrough, conveyors mounted in said conduits adapted to convey the material therethrough and simultaneously agitate the same, a heat exchange liquid contained in the bottom of the tank, a coil immersed in said liquid through which coil a heating or cooling medium is adapted to be circulated, and means adapted to draw the liquid from the bottom of the tank and cause the same to be sprayed over the outer surfaces of the conduits.

4. Apparatus for raising or lowering the temperatures of various materials comprising a tank, a plurality of pipe-like conduits extending therethrough, conveyors mounted in said conduits adapted to convey the material therethrough and simultaneously agitate the same, a heat exchange liquid contained in the bottom of the tank, a coil immersed in said liquid through which coil a heating or cooling medium is adapted to be circulated, spray pipes arranged adjacent the conduits, and a pump adapted to draw the liquid from the bottom of the tank and cause the same to be sprayed over the outer surfaces of the conduits from the spray pipes.

5. Apparatus for raising or lowering the temperatures of various materials comprising a tank, a plurality of pipe-like conduits extending therethrough, means mounted in said conduits adapted to convey the material therethrough and simultaneously to agitate the same, a heat exchange liquid contained in the bottom of the tank, a coil immersed in said liquid through which coil a heating or cooling medium is adapted to be circulated, and means adapted to draw the liquid from the bottom of the tank and cause the same to be sprayed over the outer surfaces of the conduits.

6. Apparatus for raising or lowering the temperatures of various materials comprising a tank, a plurality of pipe-like conduits extending therethrough, means mounted in said conduits adapted to convey the material therethrough and simultaneously to agitate the same, a heat exchange liquid contained in the bottom of the tank, a coil immersed in said liquid through which coil a heating or cooling medium is adapted to be circulated, spray pipes arranged adjacent the conduits, and a pump adapted to draw the liquid from the bottom of the tank and cause the same to be sprayed over the outer surfaces of the conduits from the spray pipes.

In testimony whereof, I have hereunto signed my name.

LEE NUSBAUM.